United States Patent
Yi et al.

(10) Patent No.: US 9,730,107 B2
(45) Date of Patent: Aug. 8, 2017

(54) METHOD AND APPARATUS FOR PERFORMING CELL MANAGEMENT IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 37 days.

(21) Appl. No.: 14/773,846

(22) PCT Filed: Mar. 14, 2014

(86) PCT No.: PCT/KR2014/002186
§ 371 (c)(1),
(2) Date: Sep. 9, 2015

(87) PCT Pub. No.: WO2014/142613
PCT Pub. Date: Sep. 18, 2014

(65) Prior Publication Data
US 2016/0029250 A1 Jan. 28, 2016

Related U.S. Application Data

(60) Provisional application No. 61/786,634, filed on Mar. 15, 2013.

(51) Int. Cl.
*H04W 4/00* (2009.01)
*H04W 28/16* (2009.01)
(Continued)

(52) U.S. Cl.
CPC ............ *H04W 28/16* (2013.01); *H04L 5/001* (2013.01); *H04L 5/0053* (2013.01);
(Continued)

(58) Field of Classification Search
CPC ..... H04W 28/16; H04W 24/10; H04W 48/12; H04W 88/02; H04L 5/001; H04L 5/0053; H04L 5/0073
See application file for complete search history.

(56) References Cited

U.S. PATENT DOCUMENTS

| | | |
|---|---|---|
| 2012/0115469 A1 | 5/2012 | Chen et al. |
| 2012/0157103 A1 | 6/2012 | Frenger et al. |
| 2012/0322445 A1* | 12/2012 | Kwon .................... H04W 52/04 455/436 |

FOREIGN PATENT DOCUMENTS

| | | |
|---|---|---|
| WO | 2010/030952 A2 | 3/2010 |
| WO | 2011/031096 A2 | 3/2011 |
| WO | 2012/055984 A2 | 5/2012 |

* cited by examiner

Primary Examiner — Afshawn Towfighi
(74) Attorney, Agent, or Firm — Dentons US LLP

(57) ABSTRACT

A method for and apparatus for performing a cell management in a wireless communication system is provided. A wireless device detects a cell configuration based on a cell state, the cell state is determined by at least one of a number of UEs, a data offloading, a traffic pattern, and a UE mobility. The cell state includes a dormant or a low_active in which a resource for the reference signal is smaller than a resource for a high_active, and a transmission period of the reference signal when the cell state is in the dormant or the low_active is longer than a transmission period of a reference signal when a cell state is in the high_active. Thus, a cell specific RSs such as CRS, SIB, or paging and synchronization transmission as overhead in a cell can be minimized and controlled based on the active UEs.

13 Claims, 11 Drawing Sheets

(51) Int. Cl.
*H04W 48/12* (2009.01)
*H04L 5/00* (2006.01)
*H04W 24/10* (2009.01)
*H04W 88/02* (2009.01)

(52) U.S. Cl.
CPC ........... *H04L 5/0073* (2013.01); *H04W 24/10* (2013.01); *H04W 48/12* (2013.01); *H04W 88/02* (2013.01)

METHOD AND APPARATUS FOR PERFORMING CELL MANAGEMENT IN WIRELESS COMMUNICATION SYSTEM

This application is a National Stage Entry of International Application No. PCT/KR2014/002186, filed Mar. 14, 2014, and claims the benefit of priority to U.S. Provisional Application No. 61/786,634, filed Mar. 15, 2013, both of which are incorporated by reference in their entirety for all purposes as if fully set forth herein.

TECHNICAL FIELD

The present invention relates to wireless communications, and more particularly, to a method and apparatus for performing a cell management in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted (or eliminated) controls and UE in a small cell cluster environment needs to be defined. Furthermore, it needs to be defined a cell state change and management to use limited resources for efficiency.

DISCLOSURE

Technical Problem

The present invention provides a method and apparatus for performing a cell management in a wireless communication system.

The present invention also provides a method and apparatus for performing a cell state change in a wireless communication system.

The present invention also provides a method and apparatus for transmitting a cell reference signal in a wireless communication system.

Technical Solution

In an aspect, a method for performing a cell management in a wireless communication system is provided. The method may includes receiving a radio resource configuration based on a cell state; detecting a reference signal via the cell; determining the cell state by the reference signal; and adapting a radio resource measurement based on a cell state, wherein the cell state includes a dormant or a low_active in which a resource for the reference signal is smaller than a resource for a high_active, and a transmission period of the reference signal when the cell state is in the dormant or the low_active is longer than a transmission period of a reference signal when a cell state is in the high_active.

In another aspect, an user equipment (UE) for performing a cell management in a wireless communication system is provided. The UE includes a radio frequency (RF) unit for transmitting and receiving a radio signal; and a processor operatively coupled to the RF unit, wherein the processor is configured for: receiving a radio resource configuration based on a cell state; detecting a reference signal via the cell; determining the cell state by the reference signal; and adapting a radio resource measurement based on a cell state, wherein the cell state includes a dormant or a low_active in which a resource for the reference signal is smaller than a resource for a high_active, and a transmission period of the reference signal when the cell state is in the dormant or the low_active is longer than a transmission period of a reference signal when a cell state is in the high_active.

Advantageous Effects

The proposed embodiment supports a dynamic cell change of a small cell for a user equipment so that the UE receives and detects reference signals with more efficiency and optimized RS resource.

MODE FOR INVENTION

Figure 1:
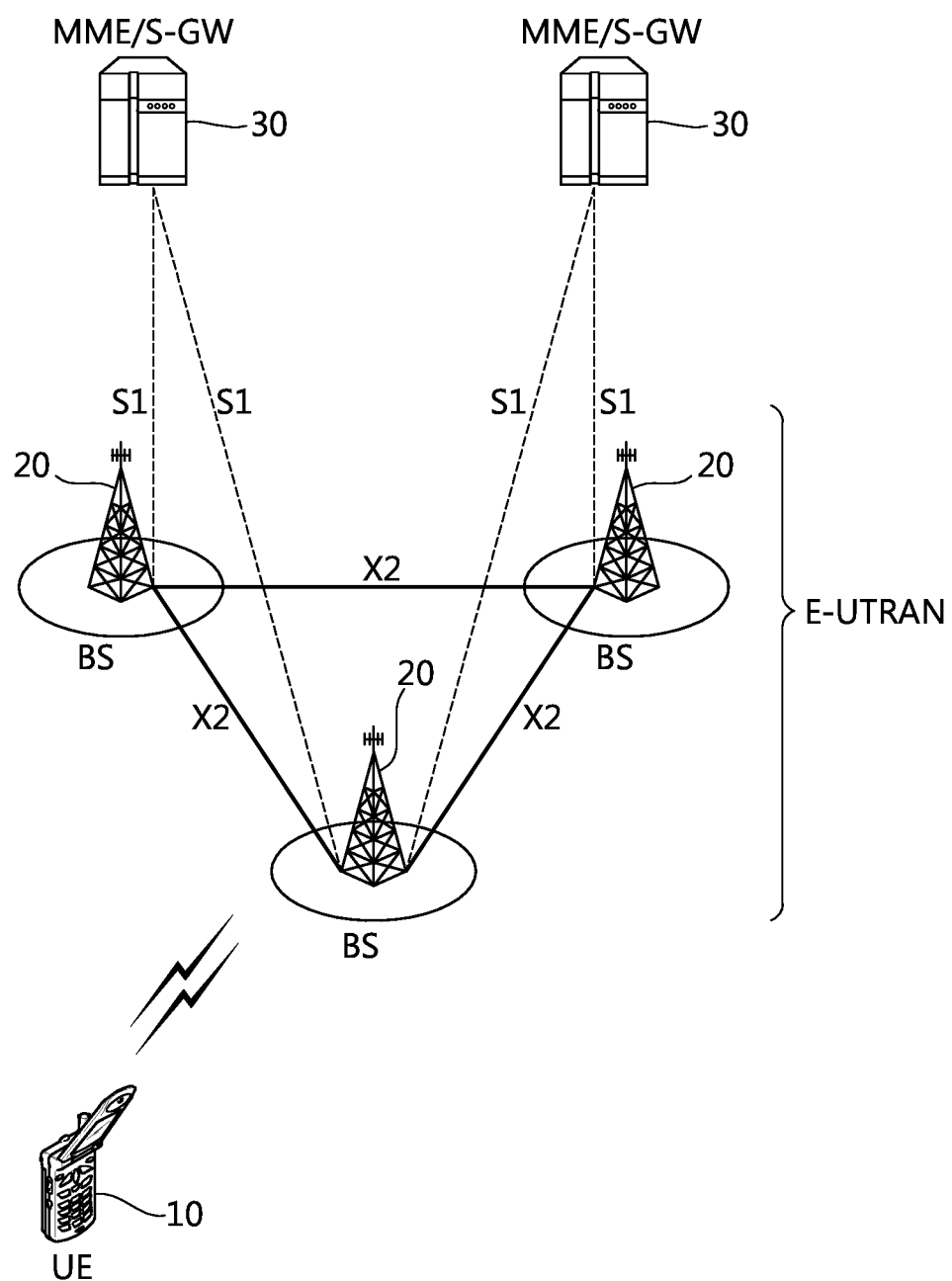
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
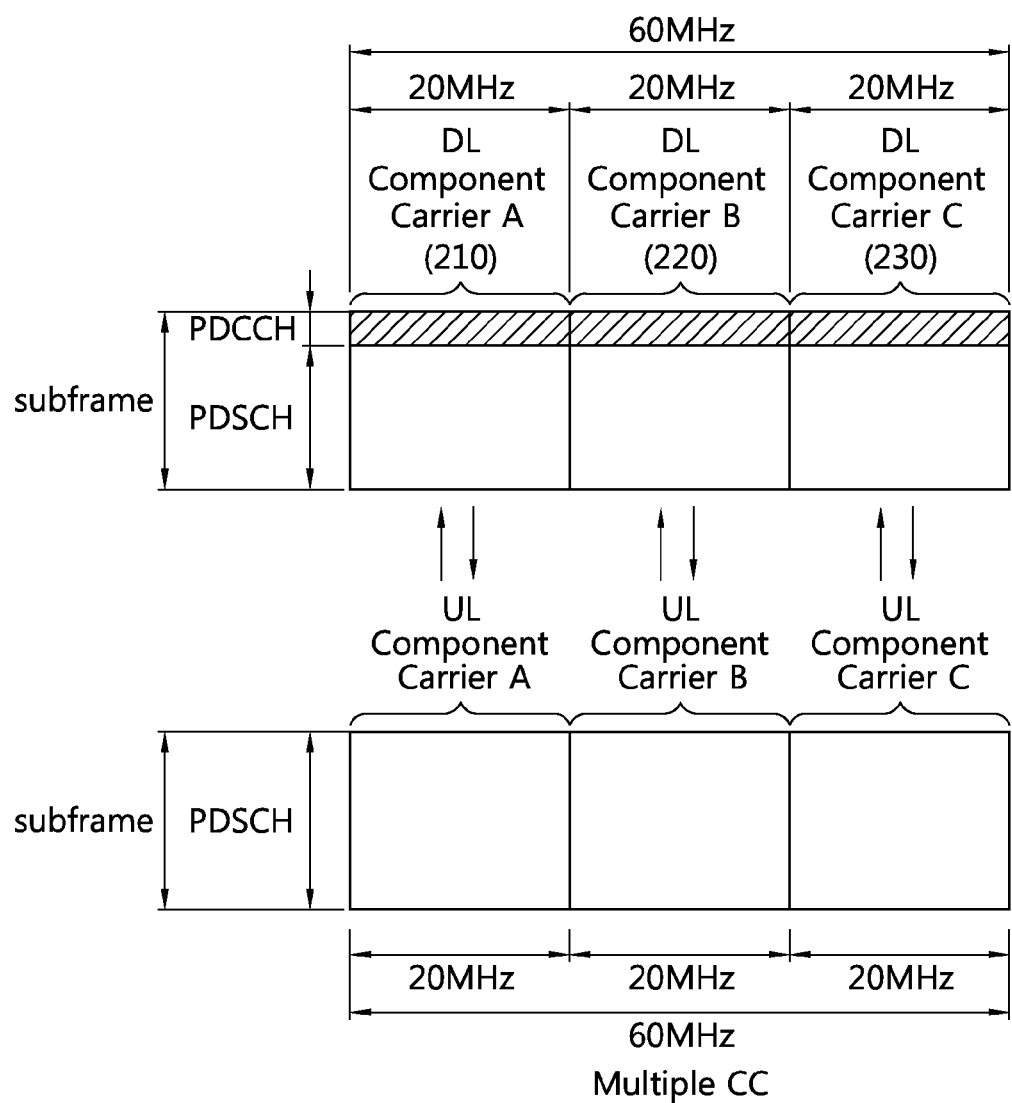
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . 7 for a serving cell index 1 corresponds to a $7^{th}$ bit from the left, which are the remaining indices other than 0, i.e., the index of the Pcell.

To enhance the user throughput, it is also considered to allow inter-node resource aggregation over more than one eNB/node where a UE may be configured with more than one carrier groups. In such cases, it is also feasible to configure PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 (which is master PCell) cannot be used for activation/deactivation. More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation.

To make some distinction between PCell for the first carrier group and the second carrier group, the PCell for the second carrier group can be noted as a S-PCell hereinafter. Herein, the index of the serving cell may be a logical index determined relatively for each UE, or may be a physical index for indicating a cell of a specific frequency band. The CA system supports a non-cross carrier scheduling (self-carrier scheduling), or cross carrier scheduling.

Figure 3:
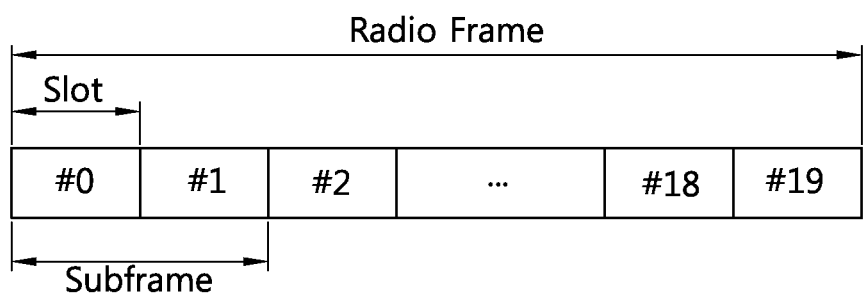
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply withe changeable manners to a corresponding system.

Figure 4:
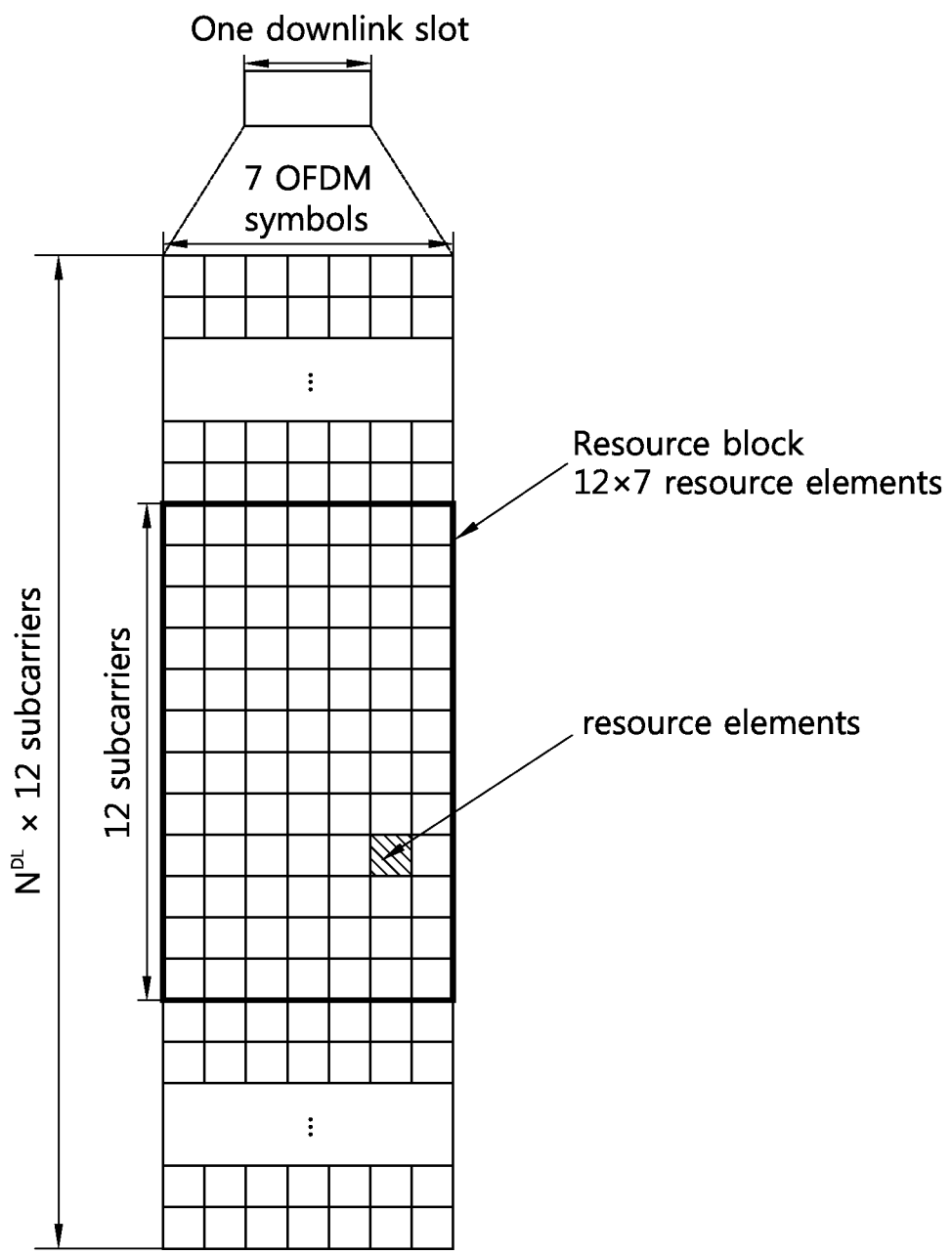
FIG. 4 is an exemplary diagram showing a resource grid for one downlink slot to which the present invention is applied.

FIG. 4 is an exemplary diagram showing a resource grid for one downlink slot to which the present invention is applied.

Referring to FIG. 4, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
| --- | --- | --- | --- |
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 5:
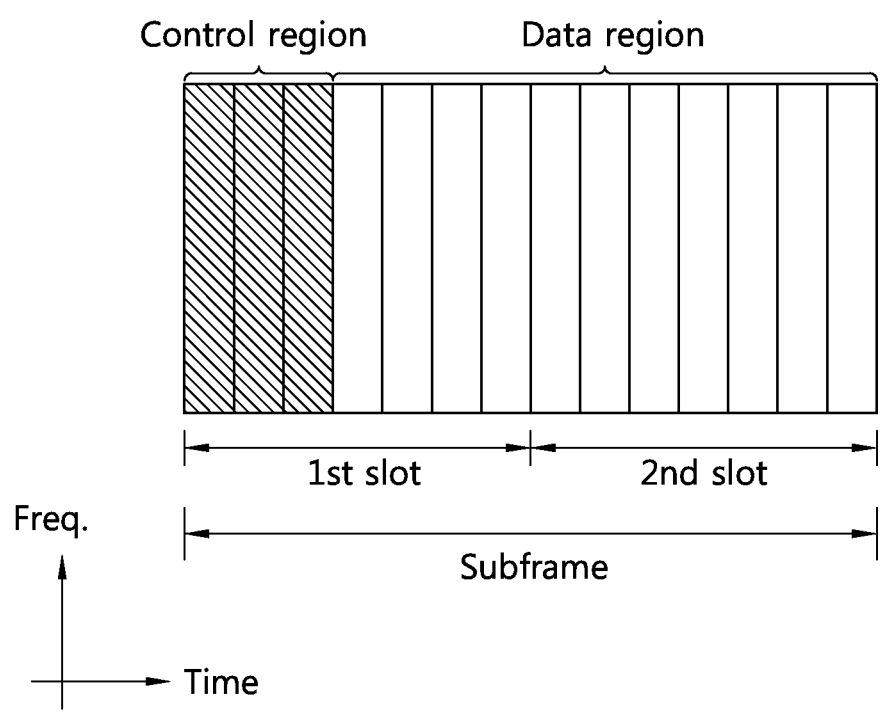
FIG. 5 shows a structure of a downlink subframe to which the present invention is applied.

FIG. 5 shows a structure of a downlink subframe to which the present invention is applied.

Referring to FIG. 5, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

Figure 7:
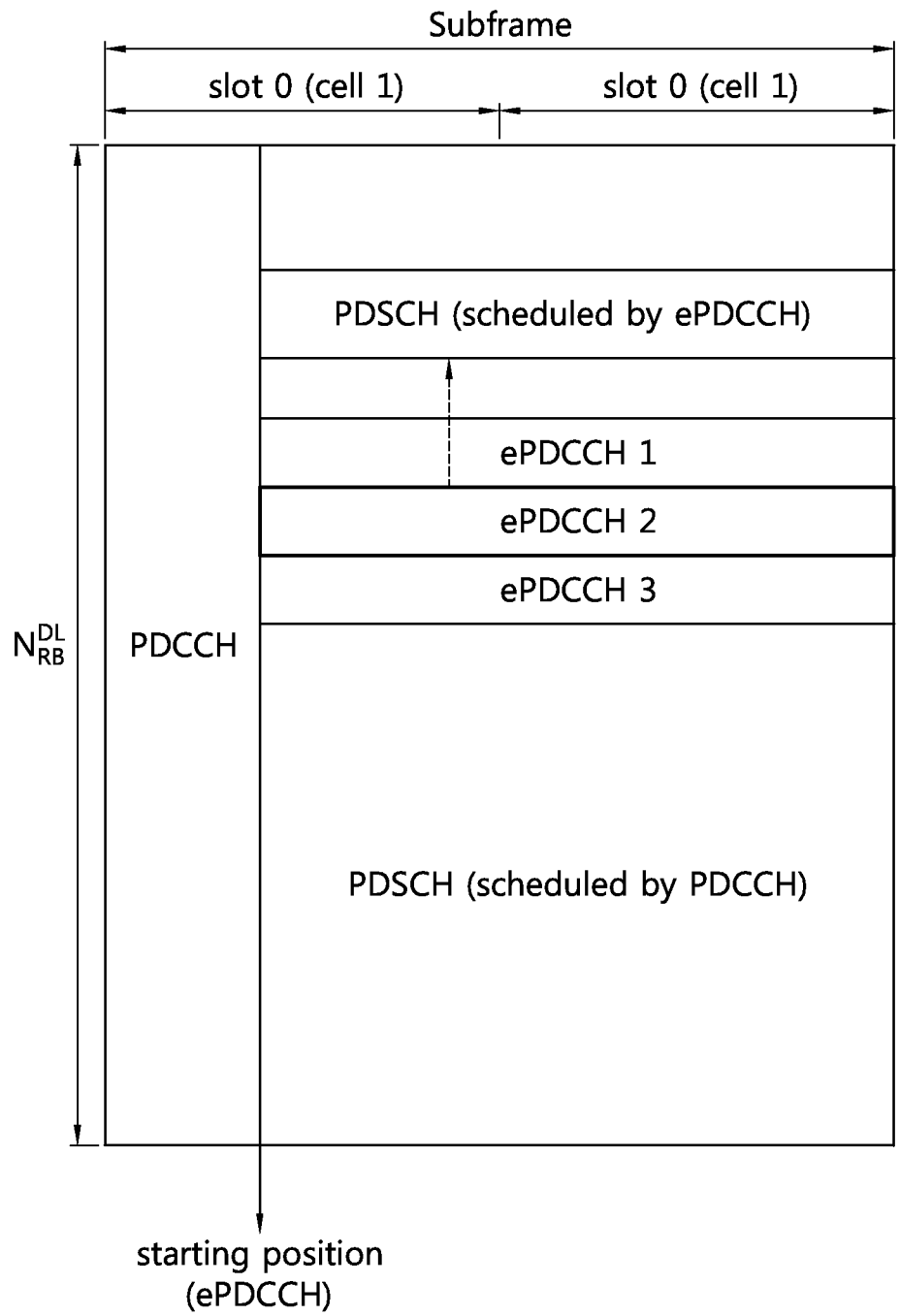
FIG. 7 shows downlink control channels to which the present invention is applied.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. Here, the ePDCCH is shown in FIG. 7 more details.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
| --- | --- |
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |

TABLE 2-continued

| DCI format | Description |
| --- | --- |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 ndicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

Carrier indicator—0 or 3 bits
Flag for identifying Format 0/Format 1A—1 bit, 0 indicates Format 0, 1 indicates Format 1A.
Frequency hopping flag—1 bit, is a Most Significant Bit (MSB) corresponding to resource allocation at need and used to assign multiple clusters.
Resource block assignment and hopping resource allocation—
$\lfloor \log_2(N_{RB}^{UL}(N_{RB}^{UL} + 1)/ 2) \rfloor$ bits
PUSCH hopping (corresponding to only single cluster assignment): $N_{UL\_hop}$ MSBs are used to obtain an $n_{PRB}(i)$ value.
$(\lfloor \log_2(N_{RB}^{UL}(N_{RB}^{UL} + 1)/2) \rfloor - N_{UL\_hop})$ bits provide the resource allocation of the first slot of an uplink subframe.
In single cluster assignment, non-hopping PUSCH
$(\lfloor \log_2(N_{RB}^{UL}(N_{RB}^{UL} + 1)/2 \rfloor)$ bits provide the resource allocation of an uplink subframe.
In multi-cluster assignment, non-hopping PUSCH: Resource assignment is obtained from a combination of a frequency hopping flag field and a resource block assignment and hopping resource allocation field.

$$\left\lceil \log_2\left(\left(\frac{\lceil N_{RB}^{UL}/p + 1 \rceil}{4}\right)\right)\right\rceil$$ bits provide resource allocation in an uplink subframe.

Wherein, P depends on the number of downlink resource blocks.
Modulation and coding scheme/redundancy version—5 bits
New data indicator—1 bit
TPC command for a scheduled PUSCH—2 bits
Cyclic shift and OCC index for DM RS—3 bits
Uplink index—2 bits, only exist for a TDD operation, that is, an uplink-downlink configuration 0
Downlink Assignment Index (DAI)—2 bits, only exist for TDD operations, that is, uplink-downlink configurations 1-6
CQI request—1 or 2 bits, a 2 bit field is applied to a UE configured using at least one downlink cell.
SRS request— 0 or 1 bit.
Multi-cluster flag—1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

Figure 6:
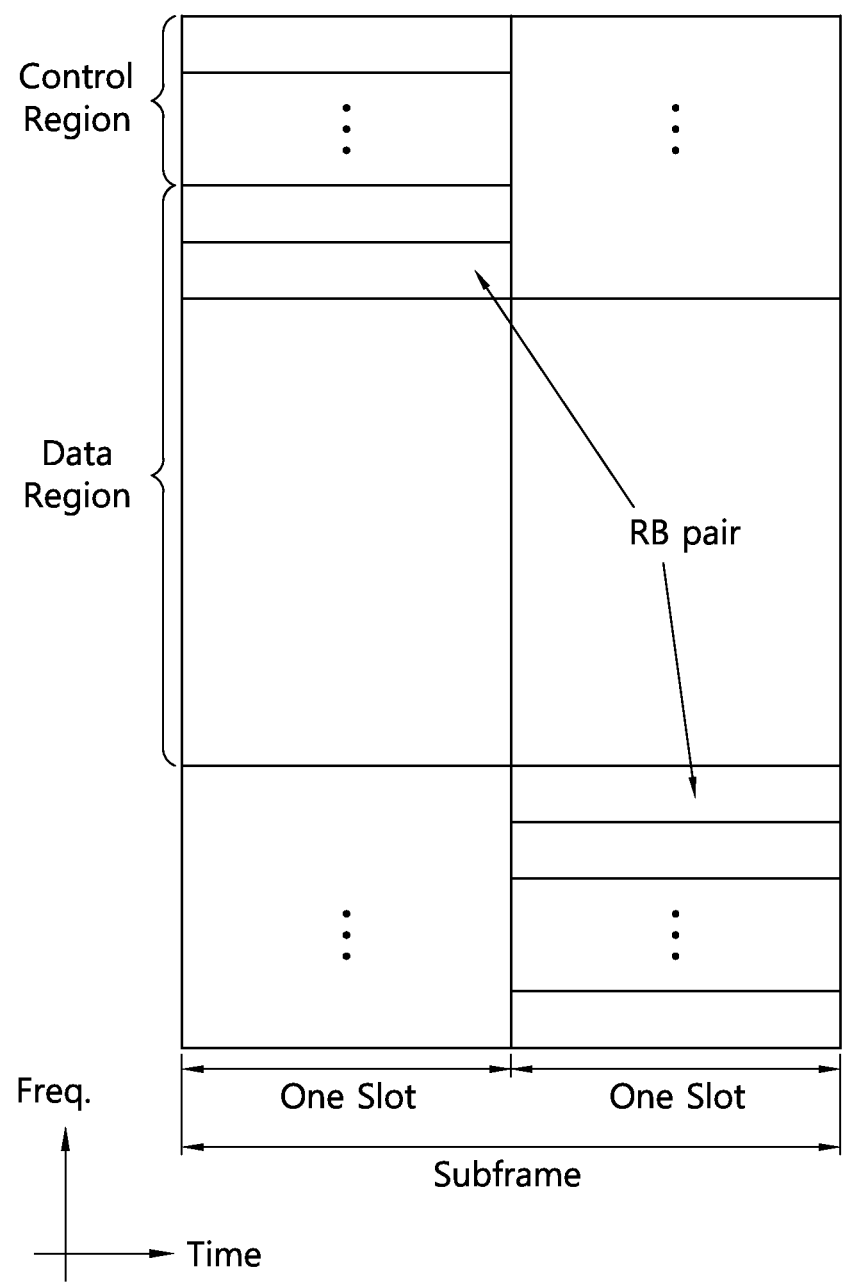
FIG. 6 shows an example of a structure of an uplink subframe carrying an ACK/NACK signal to which the present invention is applied.

FIG. 6 is a view illustrating an example of a structure of an uplink subframe carrying an ACK/NACK signal to which the present invention is applied.

Referring to FIG. 6, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

The ePDCCH can be one of solutions of limitation for a PDCCH transmission or new control information transmission of near future commination system including a new type of carrier as shown in FIG. 7. The ePDCCH which can be multiplexed with the PDSCH can support multiple Scells of the CA.

Referring to FIG. 7, the ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification may not be sufficient to perform those functions as there are a large number of neighbor small cells which like to use orthogonal resources.

For this next LTE system or enhanced communication system, this invention provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and the RRM measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200. This can also be applied to the macro cell with legacy carrier target in new carrier's environment, or with the macro cell in small cells cluster environment.

As being different from a macro cell, typically, a small cell may not have many attached UEs. In typical cases, there will be only a few or 10-20 users per small cell. To mitigate inter-cell interference issue among small cells, it is likely that enhanced PDCCH (ePDCCH) would be used in small cells rather than PDCCH. More specifically, it is expected that carrier used for small cell may not even carry PDCCH with very minimal or non-cell specific RS. For this proposed embodiment supports as a carrier without PDCCH yet scheduling PDSCH.

In current LTE specification, for a macro cell, a number of features are designed based on relatively large number of UEs. For example, control signaling design, PHICH, HARQ ACK mechanisms are designed for the case where a large number of UEs are multiplexed and serviced simultaneously.

When there are only a few UEs attached to a cell, some optimizations can be considered. Another example is a cell specific feature such as CRS, SIB transmission, etc. If the arrival rate of a new UE is relatively low, those cell specific features's overhead needs to be minimized. To address the relatively low new UE arrival rate and minimize the cell specific signaling, one easy approach to consider is 'reactive' approach where cell specific signaling is transmitted only upon the request.

For example, rather than depending on 'proactive' signaling of cell specific feature, upon a request from a UE, signaling or information can be given. A small cell may not carry periodic CRS nor SIB transmission in this proposed embodiment.

To handle the legacy UE access, one approach which may not still support first time visit UEs, is to use 'proximity' signal from a legacy UE as if it is approaching to CSG (Closed Subscriber Group). When a UE detects near-by small cell, it may initiate a proximity signal to the serving cell e.g., a macro cell which will then initiate cell specific features for the UE. This approach becomes inefficient when the number of users becomes a bit large (e.g., 10-20) as it may require redundant transmission of cell specific signaling/information for each UE.

At a certain threshold, a cell may determine that 'proactive' approach is better. If this occurs, a cell-broadcast signaling can be given to a UE to indicate that system information and CSS is enabled. Another example is to control signaling such as PDCCH and/or ePDCCH. In particular, ePDCCH localized or distributed set does design may need further consideration of small number of UEs.

In current ePDCCH design, ePDCCH and PDSCH are not allowed to be multiplexed in a PRB (Physical Resource Block) pair. For a localized ePDCCH set, if one PRB pair is configured for the localized ePDCCH set, up to 4eCCEs are available which can support up to 4 UEs with aggregation level (AL)=1. If interference is coordinated very well, in a small cell environment, it may be expected that a UE may have high SNIR and thus AL is low. When a number of serving UEs is small, it may be possible that there is less than 4 UEs per subframe scheduled by ePDCCH even though all users are shared the same set of PRBs for ePDCCH sets.

This may become more serious problem with distributed ePDCCH set where 4 PRB pairs or 8 PRB pairs are configured for one ePDCCH set. Thus, 16 or 32 eCCEs are available per subframe which can hold up to maximium 16 or 32 UEs.

To address this issue, before discussing the adaptation, it shows a few cases per number of serving UEs. When the number of UEs is small around 10-20, a control overhead shall be minimized. Multiple approaches in this proposed embodiment can be considered.

Firstly, a PDSCH scheduling based on SPS configuration can be used. Instead of using dynamic DCI to schedule each PDSCH, the SPS scheduling may be utilized.

Secondly, a system bandwidth where PDCCH is transmitted can be reduced. When the number of UEs is small, MIB may carry lower system bandwidth than actual system bandwidth so that legacy PDCCH does not consume too many resources. For example, if there is only one UE served by PDCCH, system bandwidth can be advertised with 6PRB instead of 100PRB (actual system bandwidth) where PDCCH will be carried over 6PRB only. Other 94PRBs can be used for data portion.

Thirdly, multiplexing ePDCCH and PDSCH can be used. For the same UE, if configured by higher layer or indicated in DCI, multiplexing of ePDCCH and PDSCH is allowed within a PRB to reduce the waste. Or, if the cell state is in low_active (i.e., the number of UE is small), UEs shall assume that ePDCCH and PDSCH multiplexing is allowed.

Fourthly, limitation for ePDCCH to first slot or second slot can be used to reduce ePDCCH REs, the ePDCCH may be limited to only one slot in each PRB pair.

Lastly, cross-subframe scheduling can be used. Multiple DCIs or cross-subframe scheduling DCIs can be scheduled in one subframe to schedule multiple subframes to maximize the utilization of configured control signaling portion e.g., one PRB pair configured for ePDCCH, one OFDM symbol used for PDCCH.

Figure 8:
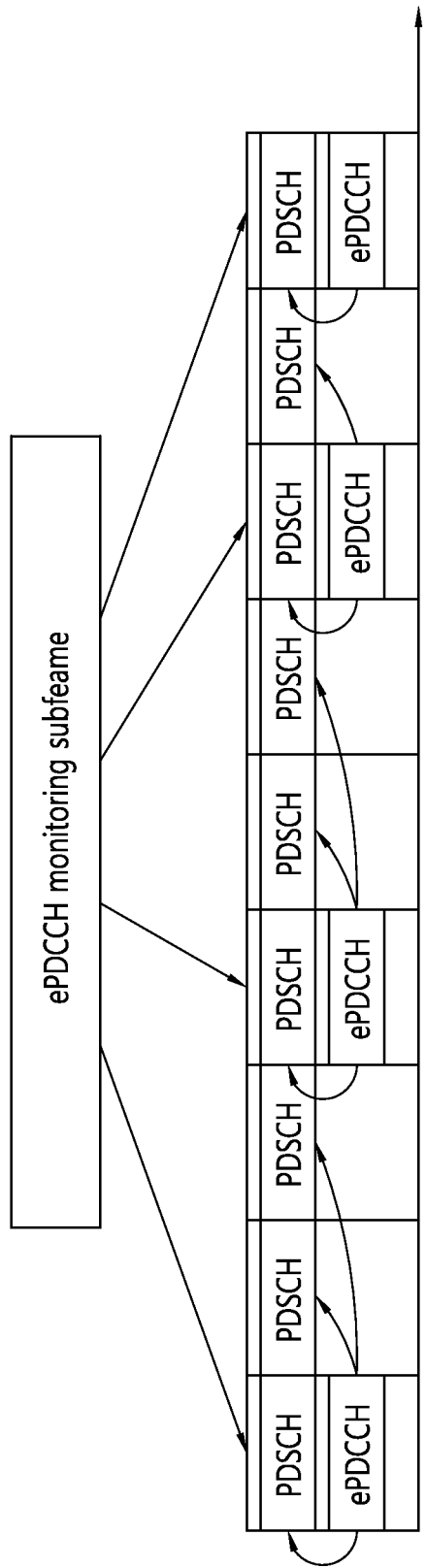
FIG. 8 shows examples of ePDCCH monitoring subframe set which the present invention is applied.

Hereinafter, subframe bundling using ePDCCH monitoring subframe configuration is described. As another approach to reduce control overhead and processing overhead when the number of UEs is small is to use subframe bundling where one DCI schedules PDSCH over multiple subframes as shown in FIG. 8.

When a UE is configured with ePDCCH monitoring subframe set and the UE is supposed to monitor only ePDCCH in those configured subframes, the UE may assume that in non-ePDCCH monitoring the PDSCH using the same resource scheduled in previous ePDCCH can be continuously transmitted without scheduling DCI (in other words, PDCCH will not be present to schedule unicast data for that UE in other subframes, yet, PDCCH may be still present to schedule cell-common data), if the non-ePDCCH monitoring subframes are not MBSFN subframes with CRS-TM configured such as TM4 or if a UE is configured with DM-RS based transmission mode such as TM9/10. Depending on the ePDCCH set configuration, the number of consecutive (or non-consecutive due to intermediate MBSFN subframe with CRS-based TM configured) subframes scheduled by one ePDCCH. For the uplink transmission, the bundling window where the same PUSCH resource can be assumed can be signaled separately. Additionally, which subframes can be used for the same resource allocation and scheduling information can be signalled explicitly either via bitmap signaling or bundling window or other means.

If there is no bundling window is configured for uplink, the UE shall assume only one subframe is scheduled by one uplink scheduling DCI. Similar to TTI bundling, HARQ-ACK timing is determined by the last subframe carrying PDSCH. Alternatively, a UE may be configured with subframe bundling window for downlink PDSCH as well. If it is configured, a UE may assume that one downlink DCI is scheduling PDSCH over the bundling window using the same resource where it may assume that except for the first subframe, ePDCCH is not transmitted in the bundling window. If there is MBSFN subframe within a bundled window, UE shall ignore that subframe from a bundling window if a UE is configured with CRS-based transmission mode and thus PDSCH will not be scheduled in those MBSFN subframes. For DM-RS based TM case, a UE may assume that MBSFN may not carry PDSCH and thus ignore MBSFN subframes from the bundling window otherwise it is configured to assume differently such as via higher layer signaling of applicable subframe bitmap. In terms of deciding bundling window, two options are possible. One is determined by the subframe index only so that MBSFN subframe will not be used for bundling unless configured otherwise and the other is determined by the non-MBSFN subframes.

Control overhead adaptation can be done by reconfiguration of ePDCCH monitoring subframes or bundling window size. Another simple approach is to configure a UE with bundling window size k which is used for both downlink and uplink. Once it is configured with a bundling window size k, a UE can assume that only one (the first non-MBSFN subframe in the bundled subframes) subframe will carry ePDCCHs for the UE. Regarding the rest of subframes, another higher layer signaling can be given to determine the behavior among PDSCH or PUSCH continuation over the bundling subframes or, DTX/DRX.

Or, if bundling window is configured, cross-subframe or multi-subframe scheduling DCIs can be placed in the first subframe for successive subframes within the bundling window. It is also notable that DCI itself (first (E)PDCCH) can carry the number of applicable subframes similar to multi-subframe scheduling.

To summarize the adaptive cell behavior, a carrier may do the followings. It transmits discovery signal only when inactive state or no user is attached or the number of served UE is small. Discovery signal may carry the information with 'low UE level' so that UEs can request delivery of system information and others when needed. A UE may perform initial RRM and cell discovery using discovery signal. System information can be delivered by USS upon request. Paging and other cell-specific information will be signaled to each UE via USS. The uplink resource and timing to transmit 'request' to receive system information, either prefixed resource/timing can be used or given by the current serving cell or use RACH-like uplink signaling. Or, a new uplink channel can be defined which is used to indicate 'proximity' to neighboring small cells.

Upon reaching a threshold, a carrier may decide to change its mode to 'proactive' mode where system information and cell-broadcast (e.g., CSS) can be enabled. This information is known to existing UEs via higher layer signaling. Alternatively, a UE may perform blind decoding to find whether CSS is enabled or not.

Once CSS is enabled, a UE can initiate BD on both USS (UE-specific search space) and CSS (common search space). The following table 4 shows available search space to UE.

TABLE 4

| Search Space Type | Aggregation level L | Size [in CCEs] | Number of PDCCH candidates | DCI formats |
|---|---|---|---|---|
| UE-specific | 1 | 6 | 6 | 0, 1, 1A, |
|  | 2 | 12 | 6 | 1B, 1D, 2, |
|  | 4 | 8 | 2 | 2A |
|  | 8 | 16 | 2 |  |
| Common | 4 | 16 | 4 | 0, 1A, 1C, |
|  | 8 | 16 | 2 | 3/3A |

Moreover, when a carrier changes its mode to 'proactive' mode, it may change its scheduling mechanism as well. The scheduling mechanism can be higher-layer signaled as well.

Depending on the number of UEs, a cell can take three states: dormant, low_active and high_active. In dormant, there is no UE connected to the cell. Low_active state can be used for a low number of UEs served and high_active can be used for the large number of UEs. In high_active state, cell-specific signaling such as PSS/SSS and/or SIB and/or CRS can be transmitted whereas in low_active state, those signals will be transmitted to each UE separately upon request.

Figure 9:
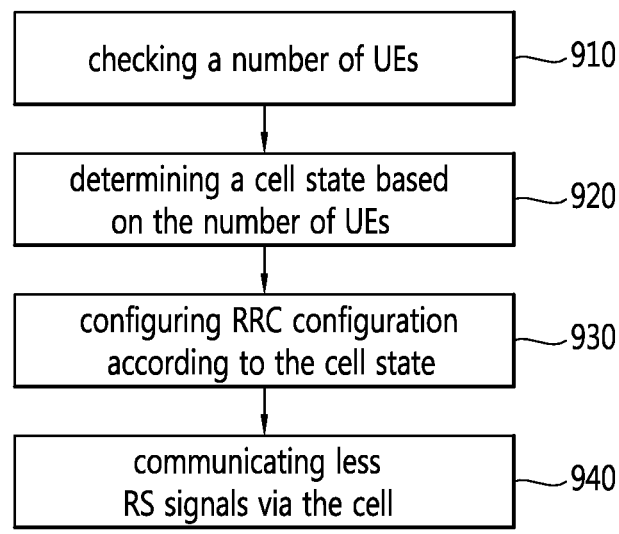
FIG. 9 and FIG. 10 shows examples of dynamic cell configuration based on a cell state which the present invention is applied.

FIG. 9 shows examples of dynamic cell configuration based on a cell state which the present invention is applied.

Referring to FIG. 9, a macro cell checks how many UE is attached in a small cell, the macro cell is an example as a control node, the macro cell can be a master cell (super cell) in small cell cluster, or a Pcell in CA environment, that is the macro cell includes any representative processing node in dynamic cell environments. In other words, when inactive state or no user is attached or the number of served UE is the small cell, the cell transmits a discovery signal only or UE specific RS such as PSS/SSS and/or SIB and/or CSS based on each UE separately so that it leads to a minimized RS signals transmission.

This invention however is not restricted to the case where additional controlling eNB is present. A eNB can make a decision based on the number of its associated UEs and other information to determine its state, and the cell state can be broadcasted either via MIB and/or SIB or cell-common broadcast dynamically or semi-statically. When a UE is received the cell state change, it can change its assumption on scheduling and cell-common control/data transmission. More specifically, the cell state can include also the cell on/off operation where when a eNB does not have many legacy UEs associated, it may perform dynamic cell on/off.

The macro cell checks whether a number of UEs in a small cell is less than or equal to a predetermined number of UEs (910). The number of UEs in a small cell is one of conditions to define a cell state, it is an element to determine dynamic cell configuration according to a cell state. The cell state includes a dormant mode, a low_active mode and high_active mode. Those of the dormant mode, the a low_active mode and the high_active mode are classified based on a number of active UE in a cell, data offloading, traffic pattern, or UE mobility. Herein that a UE mobility is low is considered as that the UE is attached to in a small cell.

The macro cell or CN (or eNB) determines a cell state among the three states based on one of conditions, the cell configuration can be changed by a cell state (920, 930). The cell configuration is preset according to the cell state separately. Or, the cell configuration is changed by dynamic DCI. That is, an indication for the cell state is followed as semi static configuration. Or, a cell off state is considered only when discovery signal is transmitted or less RS signals are transmitted, the cell can communicate the UE with applying RS resource and transmission period (940). The cell state as a conservation mode includes the dormant or the low_active in which a resource for the reference signal is smaller than a resource for a high_active, and a transmission period of the reference signal when the cell state is in the dormant or the low_active is longer than a transmission period of a reference signal when a cell state is in the high_active.

Figure 10:
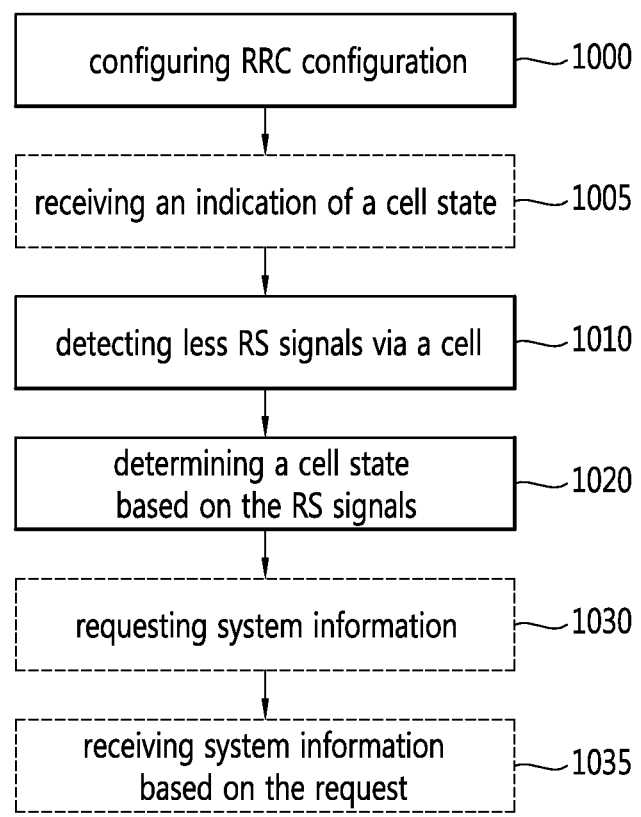

FIG. 10 shows examples of a flowchart of dynamic cell configuration by the UE which the present invention is applied.

Referring to FIG. 10, the UE may receive a configuration including system bandwidth by a serving cell (Scell) configuration, a transmission mode (TM) configuration, or a radio resource control (RRC) configuration (1000). The UE can determine a cell state based on the configuration, the configuration is set based on a cell state that is determined by at least one of a number of UEs, a data offloading, a traffic pattern, and UE's mobility by a macro cell or eNB (or CN). The macro cell can be a master cell (super cell) in small cell cluster, or a Pcell in CA environment, which is the macro cell includes any representative processing node in dynamic cell environments.

The UE receives a reference signal such as a discovery signal via the cell, the cell is a dormant or a low_active in which a resource for the reference signal is smaller than a resource for a high_active as normal cell, and a transmission period of the reference signal when the cell state is in the dormant or the low_active is longer than a transmission period of a reference signal when a cell state is in the high_active of the normal cell (1010). Herein the UE can also receive an indication to indicate a cell state (1005), the indication is signaled with a DCI, a MAC signal, or RRC signal so the UE can assume that the reference signal such as a discovery signal is less transmitted and save the resource for the reference signal such as a discovery signal than a normal transmission condition (1020). Wherein the cell state as a conservation mode includes the dormant or the low_active in which a resource for the reference signal is smaller than a resource for a high_active, and a transmission period of the reference signal when the cell state is in the dormant or the low_active is longer than a transmission period of a reference signal when a cell state is in the high_active.

Upon detecting a cell state change, a UE changes radio resource measurement procedure accordingly. For example, if the cell state changes from low_active to high_active, it may imply that CRS will be present in every subframe and thus measurement such as RRM (radio resource management) or RLM (radio link monitoring) can be performed per every subframe and the threshold for each measurement can be adapted accordingly following either preconfigured threshold values or higher layer configured values. If the cell state changes from high_active to low_active or to dormant state, the measurement should be done in subframes where discovery signals are transmitted.

To support this, a UE can be configured with potentially multiple measurement objects in prior where each measurement object can be mapped to different cell state and the appropriate measurement object will be triggered (autonomously by the UE) upon detecting a cell state change. It will be applied also to CSI feedback where different restricted measurement subframe sets can be configured and different configurations are feasible. For a neighbor cell measurement, unless a UE knows the state of neighbor cells, measurement would be done based on the assumption that the neighbor cell would be in dormant state. It is however possible that higher layer can configure the state of neighbor cells such as by configuring measurement objects. When a UE performs measurement using cell-common RS such as CRS, depending on the cell-state, the set of subframes which carry cell-common RS will be changed. One example of dormant state is that UE would not assume that CRS will be present in any subframe or only in subframes carrying discovery signals if discovery signals include CRS. In low-active state, a UE can assume that subframe #0/#5 in every radio frame can carry CRS where the antenna ports are determined by reading PBCH or configured by higher layer. In high-active, a UE can assume that all subframes carry CRS.

Thus, when it performs DRX or restricted measurement, the assumption on CRS-carrying subframes will be used appropriately. For example, radio link monitoring requires to read CRS to emulate the quality of (E)PDCCH. Thus, RLM can be performed in a subframe carrying CRS. Since a UE needs to perform RLM at least once every DRX cycle, a UE may wake up aligned with CRS-subframe at least once per every DRX to read CRS. Or, it can simply assume that (E)PDCCH monitoring subframe will also carry CRS and thus a UE can wake up in one of those subframes to perform RLM as well as monitoring (E)PDCCH during DRX operation. When a cell state is in dormant state, a UE may not perform RLM due to the lack of CRS subframes.

In summary, different cell state can be optimized differently in terms of resource management depending on the scenario. To reflect the dynamic situation changes effectively, dynamic changes of cell state would be supported where cell-state change can be applied by the UE by changing the configuration sets for radio resource and by changing UE measurement procedures.

The UE can request system information including a paging and other cell-specific information based on the UE specific request (1030) and receive the system information requested by using USS (1035). As described, the number of UE is small in a small cell and the UE each has a low mobility in the cell so that the UEs can receive the signal including paging and cell-specific information during a UE-specific search space upon the request separately. This proposed embodiment further includes that system information is received upon the request of a small group set, the small group set is categorized by the number of UEs, a data offloading, a traffic pattern, and UE mobility. Thus, the UE can receive system information including different paging and group-specific information in the cell based on the request of a small group set. Also the dotted box as numbered 1005, 1030, 1035 can be omitted when it is defined to not necessary in UE side.

Figure 11:
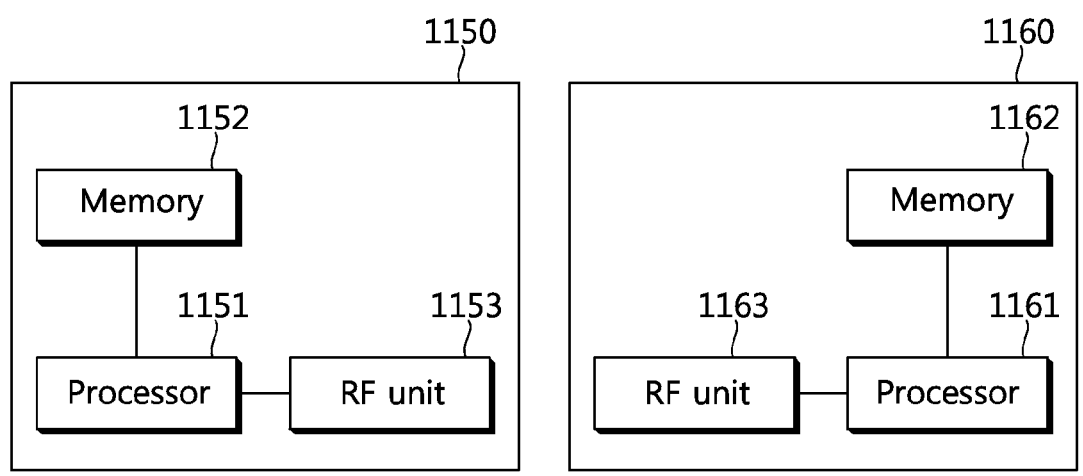
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

The processor 1151 configures an ePDCCH set to monitor in a predefined system bandwidth, the ePDCCH set consists of PRBs for detecting a predetermined subframe(s) to indicate multiple subframes to schedule data. The ePDCCH set is configured with a localized ePDCCH set or a distributed ePDCCH set. The processor 1151 makes to UE to receive the ePDCCH monitoring subframe set to determine a resource for data, the ePDCCH monitoring subframe set indicates a number of consecutive subframes.

And the processor 1151 can configure MBSFN usage of the predefined system bandwidth to supports MBMS services. Also, the processor 1151 can configure control information in a predetermined 6 Physical Resource Blocks among a predefined system bandwidth including one of 1.4 MHz, 3 MHz, 5 MHz, 10 MHz, and 20 MHz, or in a first slot or a second slot in one subframe. Or, the processor 1151 can control that the control information at a predetermined subframe based on a cross-subframe scheduling is signaled, and the data of PDSCH and the control information of PDCCH or ePDCCH are multiplexed in PRBs to be defined by the system bandwidth. Further the processor 1151 can Semi-Persistent Scheduling (SPS) configuration to schedule data based on the cell state.

Especially, the processor 1151 can determine that the cell state is a dormant, a low_active, or high active as normal condition, based on at least one of a number of UEs, a data offloading, a traffic pattern, and UE mobility. When the processor 1151 can determine that the cell state is a dormant or a low_active so that the processor 1151 can allocate a resource for the reference signal in the dormant or a low_active is smaller than a resource for a high_active, and control a transmission period of the reference signal when the cell state is in the dormant or the low_active is longer than a transmission period of a reference signal when a cell state is in the high_active.

The wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161.

Especially, the processor 1161 may configure one or more cells with different frequencies, for this invention the processor 1161 configures the cells to support Semi-Persistent Scheduling, TTI-bundling, HARQ-ACK procedures. The processor 1161 may receive, check and configure configurations for RS signals on a first cell as macro cell and a second cell of small cell to support optimized RS transmission and resource usage. The processor 1161 configures an ePDCCH set to monitor in a predefined system bandwidth, the ePDCCH set consists of PRBs for detecting a predetermined subframe(s) to indicate multiple subframes to schedule data. The ePDCCH set is configured with a localized ePDCCH set or a distributed ePDCCH set. The processor 1161 checks to receive the ePDCCH monitoring subframe set to determine a resource for data, the ePDCCH monitoring subframe set indicates a number of consecutive subframes.

And the processor 1161 can configure MBSFN usage of the predefined system bandwidth to supports MBMS services. Also, the processor 1161 can configure control information in a predetermined 6 Physical Resource Blocks among a predefined system bandwidth including one of 1.4 MHz, 3 MHz, 5 MHz, 10 MHz, and 20 MHz, or in a first slot or a second slot in one subframe. Or, the processor 1161 can control that the control information at a predetermined subframe based on a cross-subframe scheduling is signaled, and the data of PDSCH and the control information of PDCCH or ePDCCH are multiplexed in PRBs to be defined by the system bandwidth. Further the processor 1161 can Semi-Persistent Scheduling (SPS) configuration to schedule data based on the cell state.

Especially, the processor 1161 also receive a configuration including system bandwidth by a serving cell (Scell) configuration, a transmission mode (TM) configuration, or a radio resource control (RRC) configuration so that the UE can determine a cell state based on the configuration, the configuration is set based on a cell state that is determined by at least one of a number of UEs, a data offloading, a traffic pattern, and a UE mobility by a macro cell or eNB (or CN).

The processor 1161 can also determine that the cell state is a dormant, a low_active, or high active as normal condition, based on allocation of resource for the reference signal in the dormant or a low_active is smaller than a resource for a high_active, and control a transmission period of the reference signal when the cell state is in the dormant or the low_active is longer than a transmission period of a reference signal when a cell state is in the high_active. To have system information to the cell, the processor 1161 can request and receive a signal including paging and cell-specific information during a UE-specific search space upon the request. So this proposed embodiment shows a small cell in particular focused on adaptive cell behavior based on the number of serving UEs. Thus, a cell specific RSs such as CRS, SIB, or paging and synchronization transmission as overhead in the cell can be minimized based on the active UEs.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing a cell management, performed by an user equipment (UE), the method comprising:
 receiving a radio resource configuration based on a cell state;
 detecting a reference signal via the cell;
 determining the cell state by the reference signal;
 receiving a Semi-Persistent Scheduling (SPS) configuration to schedule data based on the cell state; and
 adapting a radio resource measurement based on the cell state.

2. The method of claim 1, wherein the cell state includes a dormant or a low_active in which a resource for the reference signal is smaller than a resource for a high_active, and a transmission period of the reference signal when the cell state is in the dormant or the low_active is longer than a transmission period of a reference signal when a cell state is in the high_active.

3. The method of claim 1, wherein the cell state is determined by at least one of a number of UEs, a data offloading, a traffic pattern, and a UE mobility.

4. The method of claim 1, further comprising:

receiving an indication whether the cell state is changed from a normal transmission state to a minimal transmission state for the reference signal when a number of UEs in the cell is smaller than or equal to a predetermined number of UEs; or requesting system information to the cell and receiving a signal including paging and cell-specific information during a UE-specific search space upon the request.

5. The method of claim 1, further comprising:

detecting control information in a predetermined 6 Physical Resource Blocks among a predefined system bandwidth including one of 1.4 MHz, 3 MHz, 5 MHz, 10 MHz, and 20 MHz;

detecting the control information in a first slot or a second slot in one subframe; or detecting the control information at a predetermined subframe based on a cross-subframe scheduling, the cross-subframe scheduling indicates multiple subframes to schedule data.

6. The method of claim 1, further comprising:

detecting data and the control information in PRBs to be defined by the system bandwidth in the radio resource configuration, the data and the control information are multiplexed.

7. The method of claim 1, further comprising:

receiving an enhanced Physical Downlink Control Channel (ePDCCH) monitoring subframe set to determine a resource for data, the ePDCCH monitoring subframe set indicates a number of consecutive subframes.

8. A wireless device for performing a cell management in a wireless communication system, the wireless device comprises:

a radio frequency (RF) unit for transmitting and receiving a radio signal; and a processor that:

controls the RF unit to receive a radio resource configuration based on a cell state;

detects a reference signal via the cell;

determines the cell state by the reference signal;

controls the RF unit to receive a Semi-Persistent Scheduling (SPS) configuration to schedule data based on the cell state; and adapt a radio resource measurement based on the cell state.

9. The wireless device of claim 8, wherein the cell state includes a dormant or a low_active in which a resource for the reference signal is smaller than a resource for a high_active, and a transmission period of the reference signal when the cell state is in the dormant or the low_active is longer than a transmission period of a reference signal when a cell state is in the high_active.

10. The wireless device of claim 8, wherein the cell state is determined by at least one of a number of UEs, a data offloading, a traffic pattern, and a UE mobility.

11. The wireless device of claim 10, wherein the processor further:

detects control information in a predetermined 6 Physical Resource Blocks among a predefined system bandwidth including one of 1.4 MHz, 3 MHz, 5 MHz, 10 MHz, and 20 MHz;

detects the control information in a first slot or a second slot in one subframe;

detects the control information at a predetermined subframe based on a cross-subframe scheduling, the cross-subframe scheduling indicates multiple subframes to schedule data; or detects data and the control information in PRBs to be defined by the system bandwidth in the radio resource configuration, the data and the control information are multiplexed.

12. The wireless device of claim 8, wherein the processor further:

controls the RF unit to receive an indication whether the cell state is changed from a normal transmission state to a minimal transmission state for the reference signal when a number of UEs in the cell is smaller than or equal to a predetermined number of UEs; or requests system information to the cell and receiving a signal including paging and cell-specific information during a UE-specific search space upon the request.

13. The wireless device of claim 10, wherein the processor further:

controls the RF unit to receive an enhanced Physical Downlink Control Channel (ePDCCH) monitoring subframe set to determine a resource for data, the ePDCCH monitoring subframe set indicates a number of consecutive subframes.

* * * * *